(12) United States Patent
Chen

(10) Patent No.: US 10,270,892 B2
(45) Date of Patent: Apr. 23, 2019

(54) APPARATUSES AND METHODS FOR HANDLING MOBILE ORIGINATED (MO) CELLULAR INTERNET OF THINGS (CIOT) DATA

(71) Applicant: Acer Incorporated, New Taipei (TW)

(72) Inventor: Pei-Jung Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 113 days.

(21) Appl. No.: 15/146,199

(22) Filed: May 4, 2016

(65) Prior Publication Data

US 2017/0086062 A1   Mar. 23, 2017

Related U.S. Application Data

(60) Provisional application No. 62/221,258, filed on Sep. 21, 2015.

(51) Int. Cl.
| | |
|---|---|
| *H04L 29/08* | (2006.01) |
| *H04W 4/70* | (2018.01) |
| *H04W 76/12* | (2018.01) |
| *H04W 8/04* | (2009.01) |

(52) U.S. Cl.
CPC ........ *H04L 69/325* (2013.01); *H04L 67/2842* (2013.01); *H04W 4/70* (2018.02); *H04W 76/12* (2018.02); *H04L 67/12* (2013.01); *H04L 2212/00* (2013.01); *H04W 8/04* (2013.01)

(58) Field of Classification Search
None
See application file for complete search history.

(56) References Cited

U.S. PATENT DOCUMENTS

| | | | | |
|---|---|---|---|---|
| 2013/0094395 | A1* | 4/2013 | Lopez | ............... H04L 29/12066 |
| | | | | 370/254 |
| 2013/0308564 | A1* | 11/2013 | Jain | ........................ H04B 15/00 |
| | | | | 370/329 |
| 2015/0103766 | A1 | 4/2015 | Miklos et al. | |
| 2017/0048695 | A1* | 2/2017 | Ronneke | .................. H04W 8/24 |
| 2017/0064487 | A1* | 3/2017 | Buckley | ................ H04W 4/005 |

OTHER PUBLICATIONS

Chinese language office action dated Nov. 17, 2017, issued in application No. TW 105117523.
"3GPP TR 45.820 V2.1.0; 3rd Generation Partnership Project; Technical Specification Group GSM/EDGE Radio Access Network; Cellular System Support for Ultra Low Complexity and Low Throughput Internet of Things (Release 13);" Aug. 2015; pp. 1, 35-36, 39-41, 496-497.

* cited by examiner

*Primary Examiner* — James P Duffy
(74) *Attorney, Agent, or Firm* — McClure, Qualey & Rodack, LLP

(57) ABSTRACT

A cellular station including a wireless transceiver and a controller is provided. The wireless transceiver performs wireless transmission and reception to and from a mobile communication device. The controller receives an RRC (Radio Resource Control) Connection Setup Complete message including CIoT data from the mobile communication device via the wireless transceiver, buffers the CIoT data and inquires a Mobility Management Entity (MME) about information of a Serving Gateway (S-GW) in response to receiving the RRC Connection Setup Complete message, and sends the CIoT data to the S-GW according to the inquired information of the S-GW.

3 Claims, 10 Drawing Sheets

APPARATUSES AND METHODS FOR HANDLING MOBILE ORIGINATED (MO) CELLULAR INTERNET OF THINGS (CIOT) DATA

CROSS REFERENCE TO RELATED APPLICATIONS

This Application claims priority of U.S. Provisional Application No. 62/221,258, filed on Sep. 21, 2015, the entirety of which is incorporated by reference herein.

BACKGROUND OF THE APPLICATION

Field of the Application

The application generally relates to wireless communications for Cellular Internet of Things (CIoT), and more particularly, to cellular stations, Mobility Management Entities (MMEs), and methods for handling Mobile Originated (MO) CIoT data.

Description of the Related Art

Cellular Internet of Things (CIoT) is an emerging technology, linking different communication devices, including sensors and actuators, such as Radio Frequency Identifications (RFID), Global Positioning Systems (GPS), and laser scanners, through various wireless technologies, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and Time- Division LTE (TD-LTE) technology, etc.

Typically, the CIoT technology is used for various purposes related to information collection and analysis, such as monitoring the behavior of persons, things, and/or data through space and time, achieving real-time awareness of a physical environment, assisting human decision making through deep analysis and data visualization, gathering information in diverse settings including natural ecosystems, buildings, and factories and sending the information to one or more server stations. The collected and analyzed information may be used for automation and control, such as automated control of closed systems, control of consumption to optimize resource use across networks, and automated control in an open environment with uncertainty. The emergence of the CIoT technology is promoted by a wide range of applications, including security surveillance, medical, environmental and weather monitoring, monitoring and control of industrial processes, such as agriculture, smart spaces, and smart cities, among others.

In general, a CIoT User Equipment (UE) is powered by a battery and most of the time, it's hard to charge or replace the battery. Also, the wireless communications initiated by a CIoT UE often only involve infrequent small CIoT data transmission. For these reasons, it is desirable to have an energy-efficient way of delivering Mobile Originated (MO) CIoT data, especially for a CIoT UE operating in idle mode.

BRIEF SUMMARY OF THE APPLICATION

In a first aspect of the application, a cellular station comprising a wireless transceiver and a controller is provided. The wireless transceiver is configured to perform wireless transmission and reception to and from a mobile communication device. The controller is configured to receive a RRC (Radio Resource Control) Connection Setup Complete message comprising CIoT data from the mobile communication device via the wireless transceiver, buffer the CIoT data and inquire a Mobility Management Entity (MME) about information of a Serving Gateway (S-GW) in response to receiving the RRC Connection Setup Complete message, and send the CIoT data to the S-GW according to the inquired information of the S-GW.

In a second aspect of the application, a network device, configured as an MME, comprising a controller and a non-transitory computer readable storage medium is provided. The non-transitory computer readable storage medium is configured to store instructions which, when executed by the controller, cause the controller to perform steps comprising: receiving a NAS (Non-Access Stratum) signaling message from a cellular station, determining whether the NAS signaling message comprises CIoT data, and sending the CIoT data to an S-GW in response to the NAS message comprising the CIoT data.

In a third aspect of the application, a cellular station comprising a wireless transceiver and a controller is provided. The wireless transceiver is configured to perform wireless transmission and reception to and from a mobile communication device. The controller is configured to receive an RRC Connection Setup Complete message comprising a service request and an indicator for CIoT data from the mobile communication device via the wireless transceiver, send the service request to an MME in response to receiving the RRC Connection Setup Complete message, request the mobile communication device via the wireless transceiver to send an UL Information Transfer message comprising the CIoT data when receiving information of an S-GW from the MME, and send the CIoT data to the S-GW according to the information of the S-GW.

Other aspects and features of the invention will become apparent to those with ordinary skill in the art upon review of the following descriptions of specific embodiments of the cellular stations, network devices, and methods for handling MO CIoT data.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3rd Generation Partnership Project (3GPP) specifications are used to teach the spirit of the application, and the application is not limited thereto.

Figure 1:
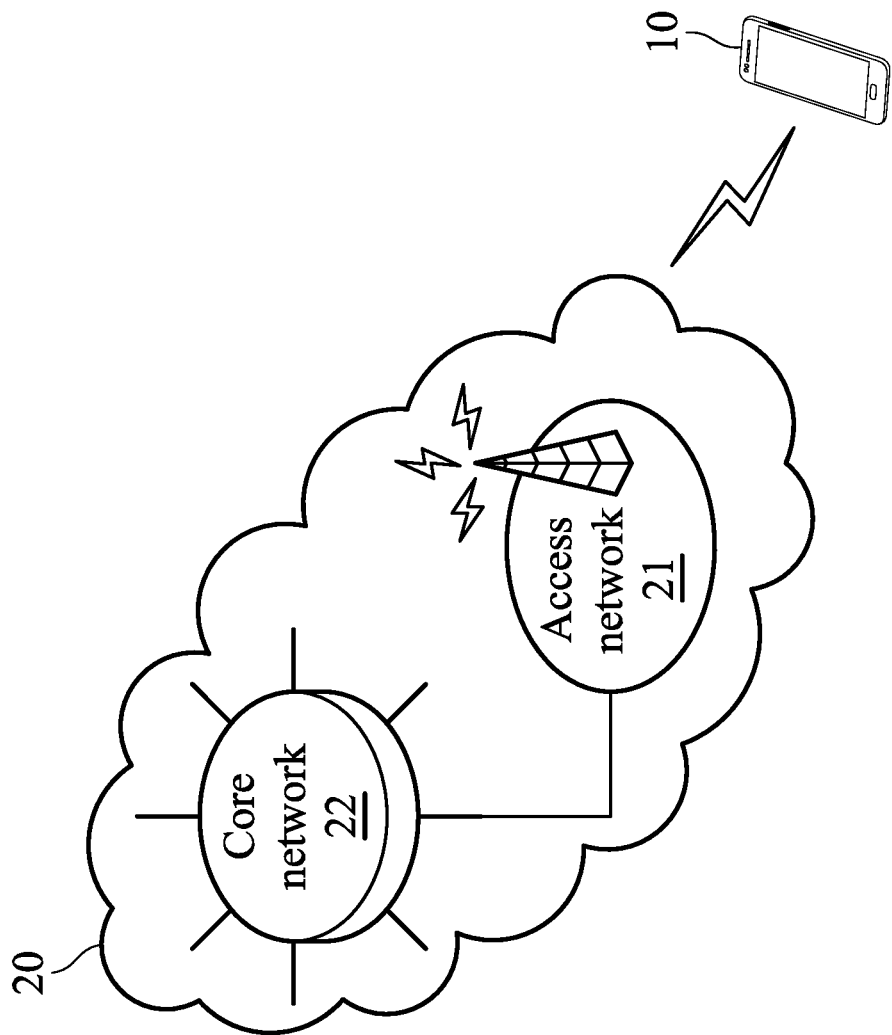
FIG. 1 is a block diagram of a wireless communication environment according to an embodiment of the application.

FIG. 1 is a block diagram of a wireless communication environment according to an embodiment of the application. The wireless communication environment comprises a mobile communication device 10 and a service network 20, wherein the mobile communication device 10 is wirelessly connected to the service network 20 for obtaining mobile services. The mobile communication device 10 may be referred to as a UE or Mobile Station (MS), such as a feature phone, a smartphone, a panel Personal Computer (PC), a laptop computer, or any computing device supporting the wireless technology utilized by the service network 20. In one embodiment, the mobile communication device 10 may be configured for CIoT and run an application for CIoT. For example, the mobile communication device 10 may be a CIoT sensor employed to monitor the operation status of a certain facility, such as a water treatment facility or bridge, or monitor biological information, such as blood pressure, body temperature, and/or heart rate of the wearer, and report measurement results back to control centers.

The service network 20 may an LTE network, an LTE-A network, or a TD-LTE network. Specifically, the service network 20 comprises an access network 21 and a core network 22, wherein the access network 21 is responsible for processing radio signals, terminating radio protocols, and connecting the mobile communication device 10 with the core network 22, while the core network 22 is responsible for performing mobility management, network-side authentication, and interfaces with public/external networks (e.g., the Internet). Each of the access network 21 and the core network 22 may comprise one or more network nodes for carrying out said functions. For example, the access network 21 may be an Evolved-Universal Terrestrial Radio Access (E-UTRAN) which includes at least a cellular station, e.g., an evolved NB (eNB), and the core network 142 may be an Evolved Packet Core (EPC) which includes a Home Subscriber Server (HSS), Mobility Management Entity (MME), Serving Gateway (S-GW), and Packet Data Network Gateway (PDN-GW or P-GW), etc.

In the use case of CIoT, the access network 21 may also be referred to as a CIoT Radio Access Network (RAN).

The HSS is a central database that contains user-related and subscription-related information. The functionalities of the HSS include mobility management, call and session establishment support, user authentication and access authorization.

The MME (for Mobility Management Entity) deals with the control plane. It handles the signaling related to mobility and security for E-UTRAN access. The MME is responsible for the tracking and the paging of UE in idle-mode. It is the termination point of the Non-Access Stratum (NAS).

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle mode UEs, the SGW terminates the downlink data path and triggers paging when downlink data arrives for the UE. It manages and stores UE contexts, e.g. parameters of the Internet Protocol (IP) bearer service, network internal routing information. It also performs replication of the user traffic in case of lawful interception.

The P-GW provides connectivity from the UE to external Packet Data Networks (PDNs) by being the point of exit and entry of traffic for the UE. A UE may have simultaneous connectivity with more than one P-GW for accessing multiple PDNs. The P-GW is also responsible for performing policy enforcement, packet filtering for each user, charging support, lawful interception, and packet screening.

In one embodiment, the MME and S-GW may cooperate with each other to serve as a Cellular S-GW (C-SGN) which is responsible for providing functionalities, including mobility management, small data transmission, paging, and NAS signaling, which are simplified and optimized for CIoT.

Figure 2:
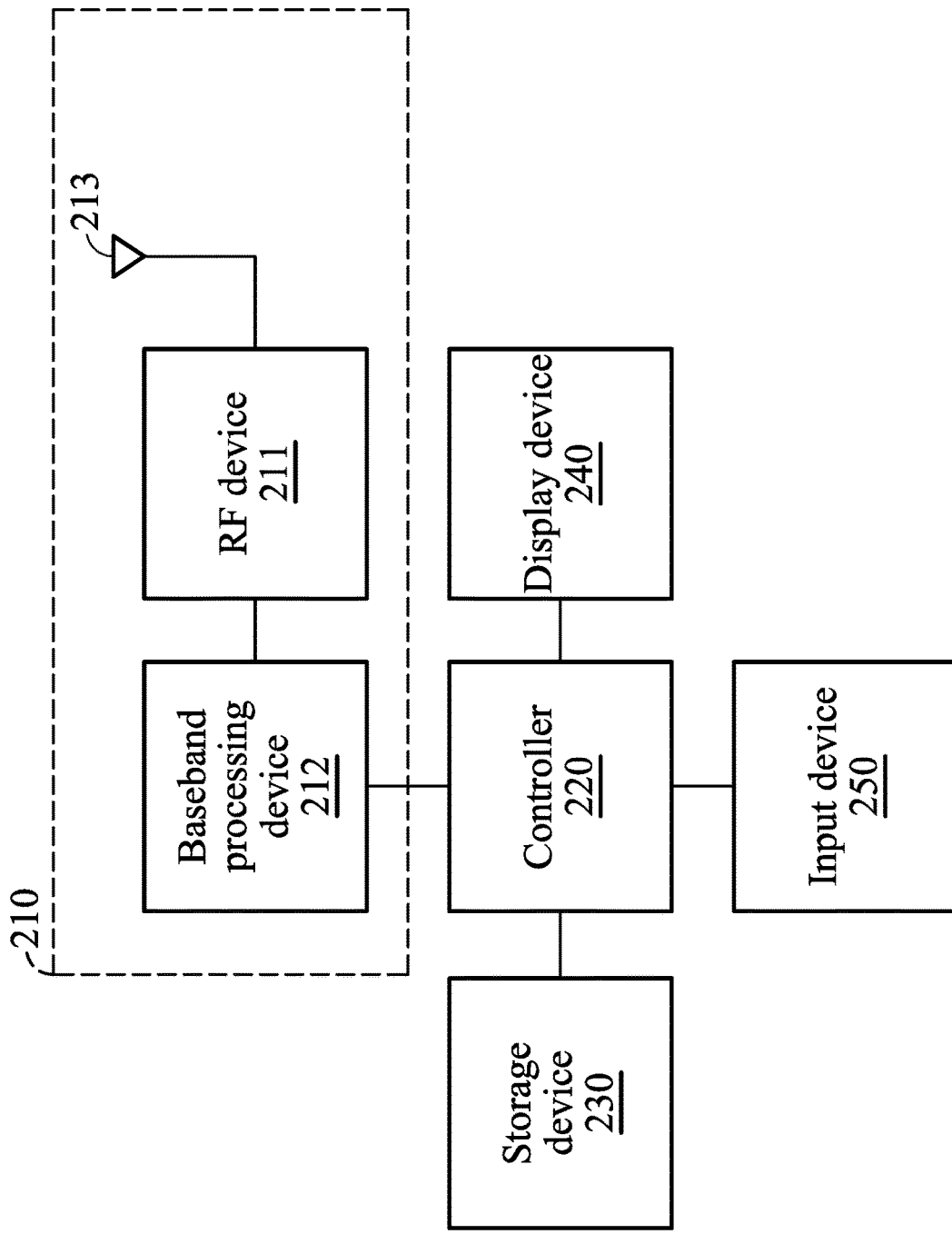
FIG. 2 is a block diagram illustrating the mobile communication device 10 according to an embodiment of the application.

FIG. 2 is a block diagram illustrating the mobile communication device 10 according to an embodiment of the application. The mobile communication device 10 comprises a wireless transceiver 210, a controller 220, a storage device 230, a display device 240, and an input device 250. The wireless transceiver 210 is configured to perform wireless transmission and reception to and from the service network 20. The wireless transceiver 210 comprises a Radio Frequency (RF) device 211, a baseband processing device 212, and an antenna 213. The baseband processing device 212 is configured to perform baseband signal processing and control the communications between subscriber identity card(s) (not shown) and the RF device 211. The baseband processing device 212 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 211 may receive RF wireless signals via the antenna 213, convert the received RF wireless signals to baseband signals, which are processed by the baseband processing device 212, or receive baseband signals from the baseband processing device 212 and convert the received baseband signals to RF wireless signals, which are later transmitted via the antenna 213. The RF device 211 may also contain multiple hardware devices to perform radio frequency conversion. For example, the RF device 211 may comprise a mixer to multiply the baseband signals with a carrier oscillated in the radio frequency of the supported wireless technology, wherein the radio frequency may be 900 MHz, 2100 MHz, or 2.6 GHz utilized in the LTE/LTE-A/TD-LTE technology, or another radio frequency, depending on the wireless technology in use.

The controller 220 may be a general-purpose processor, a Micro Control Unit (MCU), an application processor, a Digital Signal Processor (DSP), or the like, which includes various circuitry for providing the function of data processing and computing, controlling the wireless transceiver 210 for wireless communications with the service network 20, storing and retrieving data to and from the storage device 230, sending a series of frame data (e.g. representing text messages, graphics, images, etc.) to the display device 240, receiving signals from the input device 250. In particular, the controller 220 coordinates the aforementioned operations of the wireless transceiver 210, the storage device 230, the display device 240, and the input device 250 to perform the method of the present application.

In another embodiment, the controller 220 may be incorporated into the baseband processing device 212, serving as a baseband processor.

The storage device 230 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 240 may be a Liquid-Crystal Display (LCD), Light-Emitting Diode (LED) display, or Electronic Paper Display (EPD), etc., for providing a display function. Alternatively, the display device 240 may further comprise one or more touch sensors disposed thereon or thereunder for sensing touches, contacts, or approximations of objects, such as fingers or styluses.

The input device 250 may comprise one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 2 are for illustrative purposes only and are not intended to limit the scope of the application. For example, the mobile communication device 10 may further comprise a power supply, and/or a sensor for sensing the water level of a water facility, or sensing leaks in a gas pipe, or sensing biological information, such as blood pressure, body temperature, and/or heart rate, of a wearer.

Figure 3:
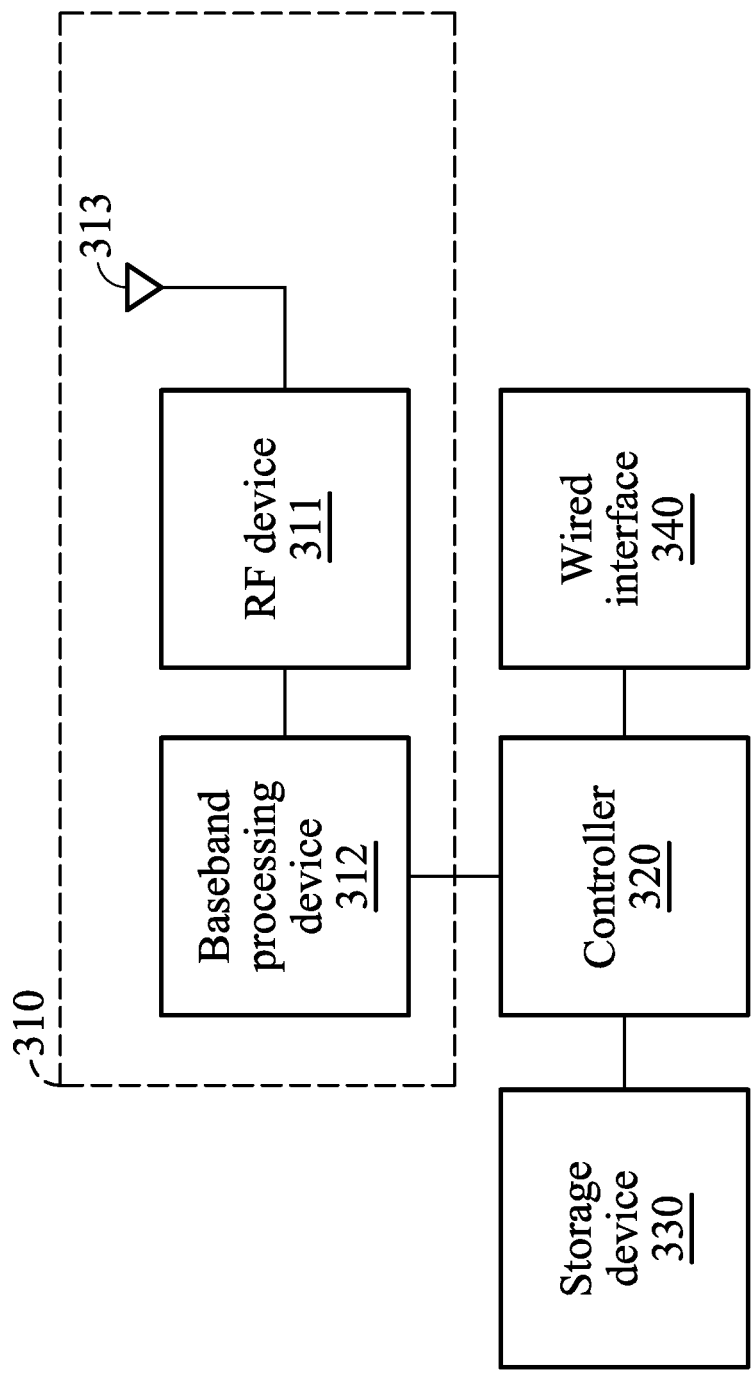
FIG. 3 is a block diagram illustrating a cellular station according to an embodiment of the application.

FIG. 3 is a block diagram illustrating a cellular station according to an embodiment of the application. The cellular station comprises a wireless transceiver 310, a controller 320, a storage device 330, and a wired interface 340. The wireless transceiver 310 is similar to the wireless transceiver 210 in FIG. 2, and thus, the detailed description is not repeated herein for brevity.

The controller 320 may be a general-purpose processor, an MCU, an application processor, a DSP, or the like, which includes various circuitry for providing the function of data processing and computing, controlling the wireless transceiver 310 for wireless communications with the mobile communication device 10, storing and retrieving data to and from the storage device 330, and sending/receiving messages to/from other network entities through the wired interface 340. In particular, the controller 320 coordinates the aforementioned operations of the wireless transceiver 310, the storage device 330, and the wired interface 340 to perform the method of the present application.

In another embodiment, the controller 320 may be incorporated into the baseband processing device 312, serving as a baseband processor.

The storage device 330 may be a memory, such as a FLASH memory or a NVRAM, or a magnetic storage device, such as a hard disk or a magnetic tape, or an optical disc, or any combination thereof for storing instructions and/or program code of applications, communication protocols, and/or the method of the present application.

The wired interface 340 is responsible for providing wired communications with other network entities, such as MMES and S-GWs, of the service network 20. The wired interface 340 may include a cable modem, an Asymmetric Digital Subscriber Line (ADSL) modem, a Fiber-Optic Modem (FOM), and/or an Ethernet network interface.

It should be understood that the components described in the embodiment of FIG. 3 are for illustrative purposes only and are not intended to limit the scope of the application. For example, the cellular station may further include other functional devices, such as a display device (e.g., LCD, LED display, or EPD, etc.), an I/O device (e.g., button, keyboard, mouse, touch pad, video camera, microphone, speaker, etc.), and a power supply, etc.

Figure 4:
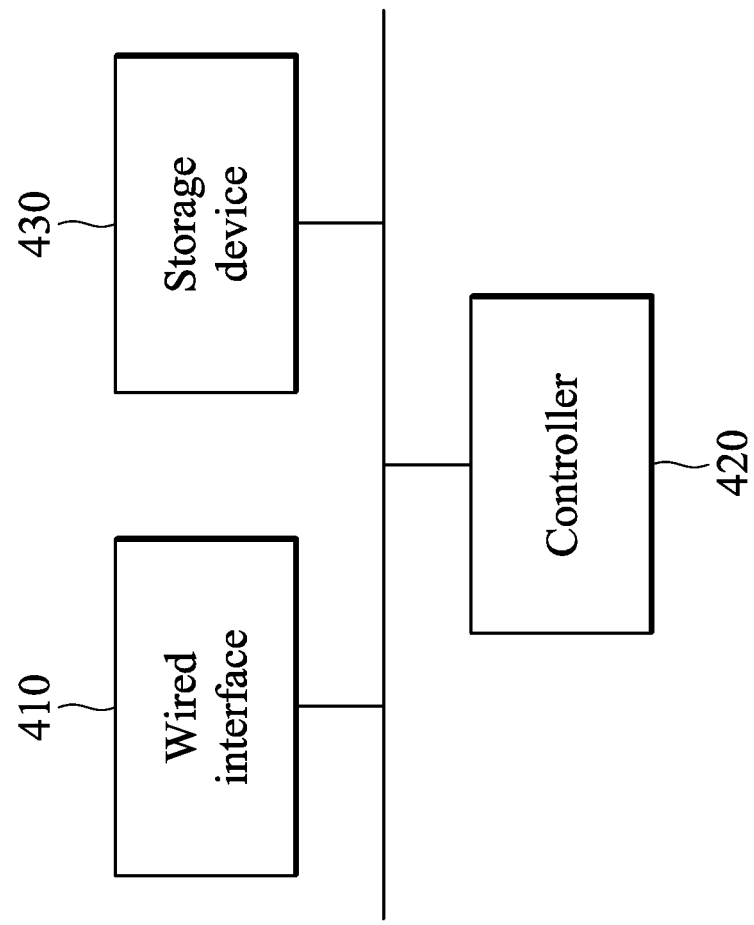
FIG. 4 is a block diagram illustrating a network device according to an embodiment of the application.

FIG. 4 is a block diagram illustrating a network device according to an embodiment of the application. The network device may be configured as an MME or an S-GW. Specifically, the network device includes a wired interface 410, a controller 420, and a storage device 430.

The wired interface 410 is responsible for providing wired communications with other network entities, such as cellular stations, MMEs/S-GWs, and P-GWs, of the service network 20. The wired interface 410 may include a cable modem, an ADSL modem, a FOM, an Ethernet network interface, or another wired interface.

The controller 420 may be a general-purpose processor, an MCU, an application processor, a DSP, or the like, which includes various circuitry for providing the function of data processing and computing, controlling the operation of the wired interface 410, and loading and executing a series of instructions and/or program codes from the storage device 430, to provide the MME/S-GW functionalities and perform the method of the present application.

The storage device 430 is a non-transitory computer readable storage medium, such as a memory (e.g., RAM, Flash memory, or NVRAM, etc.), a magnetic storage device (e.g., magnetic tape or hard disk), an optical storage device (e.g., CD-ROM), or any combination thereof for storing instructions and/or program codes of applications, communication protocols, and/or the method of the present application.

Although not shown, the network device may further include other functional units, such as an I/O device (e.g., display device, button, keyboard, mouse, touch pad, or touch screen, etc.), and a power supply, and the application is not limited thereto.

As will be appreciated by persons skilled in the art, the circuitry of the controller 220, 320, and 420 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

Figure 5A:
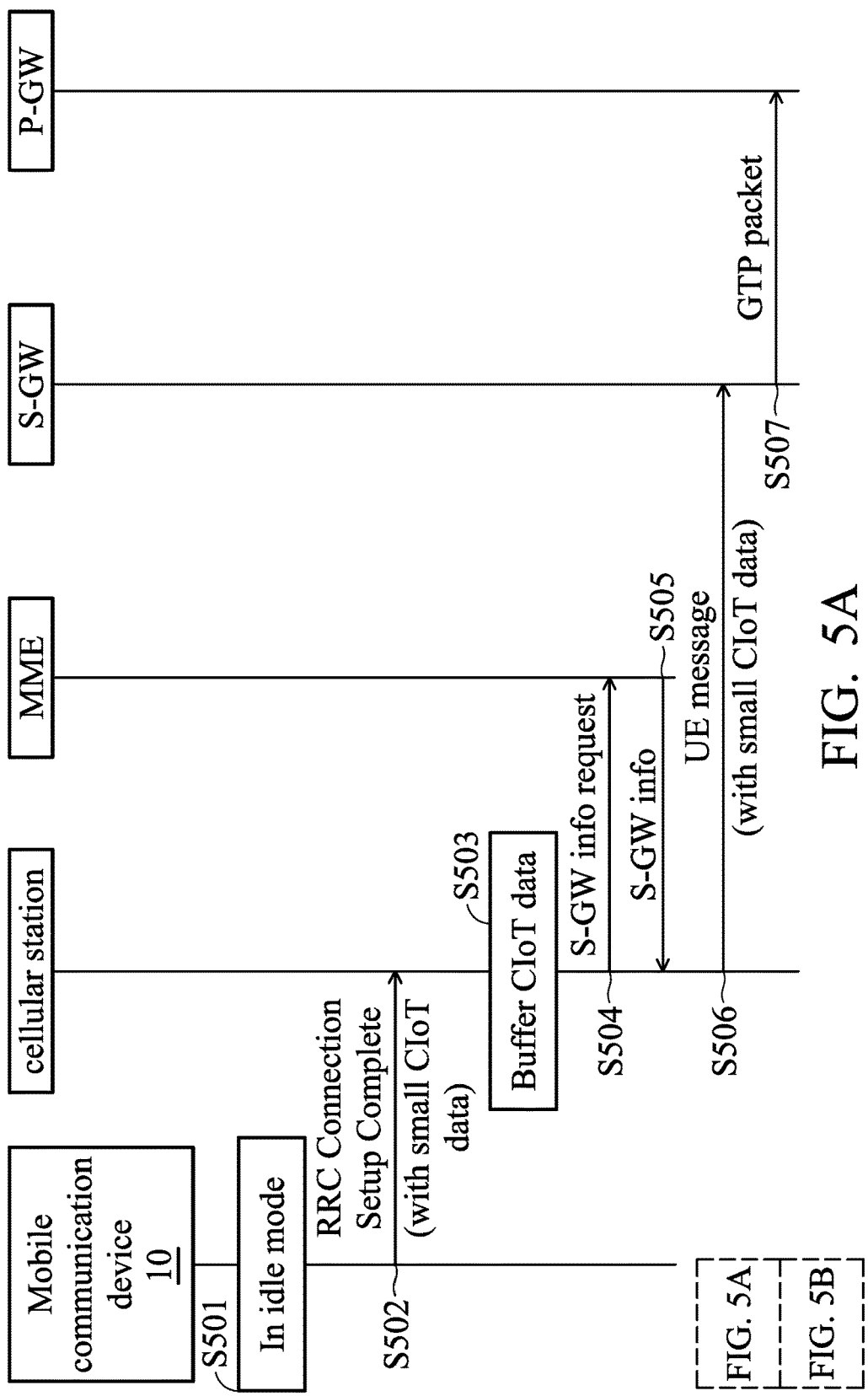
FIGS. 5A and 5B show a message sequence chart illustrating the signaling flow for delivering MO CIoT data through an RRC Connection Setup Complete message according to an embodiment of the application.
Figure 5B:
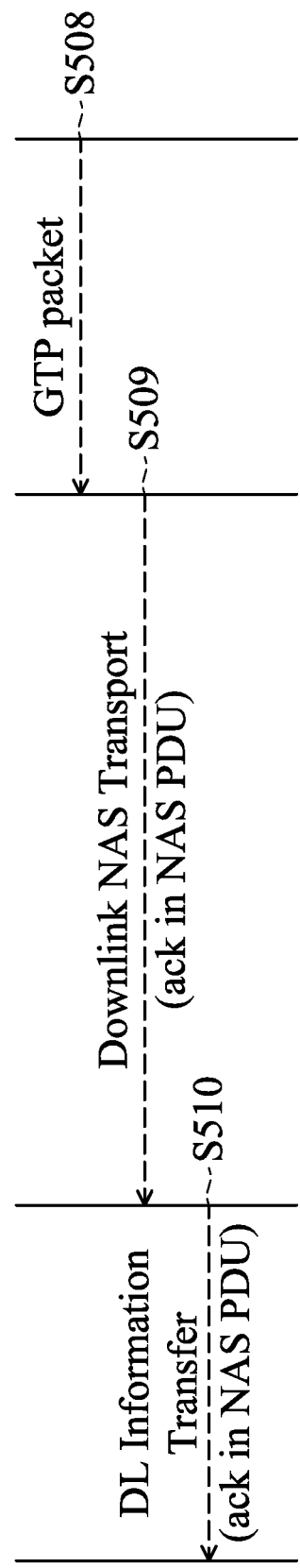

FIGS. 5A and 5B show a message sequence chart illustrating the signaling flow for delivering MO CIoT data through a RRC Connection Setup Complete message according to an embodiment of the application. To begin, the mobile communication device 10 is configured as a CIoT UE and operating in the idle mode (step S501). In response to initiating small CIoT data transmission, the mobile communication device 10 includes the CIoT data in a NAS Protocol Data Unit (PDU) and sends a RRC Connection Setup Complete message comprising the NAS PDU to the serving cellular station (step S502). The cellular station retrieves the CIoT data from the RRC Connection Setup Complete message and locally buffers the CIoT data (step S503).

Next, the cellular station sends an S-GW information request to the MME to inquire the information of the S-GW (step S504). In reply, the MME sends the information of the S-GW to the cellular station (step S505).

Subsequently, the cellular station includes the buffered CIoT data in a UE message and sends the UE message to the S-GW according to the inquired information of the S-GW (step S506). When receiving the UE message, the S-GW retrieves the IP address and Tunnel Endpoint Identifier (TEID) of the P-GW, forms a GPRS Tunneling Protocol (GTP) packet including the CIoT data, and sends the GTP packet to the P-GW (step S507).

In one embodiment, the mobile communication device 10 may request an acknowledgement of the small CIoT data transmission, and the P-GW may receive a response IP packet with the acknowledgement. When receiving the response IP packet, the P-GW may reply to the S-GW with a GTP packet including the acknowledgement (step S508). After that, the S-GW may include the acknowledgement in a NAS PDU of a Downlink NAS Transport message and send the Downlink NAS Transport message to the cellular station (step S509). In response to receiving the Downlink NAS Transport message, the cellular station may retrieve the NAS PDU, include it in a Downlink (DL) Information Transfer message, and send the DL Information Transfer message to the mobile communication device 10 (step S510).

Please note that, unlike a conventional cellular station, the cellular station in this embodiment is capable of buffering the CIoT data and inquiring the MME about the information of the S-GW when receiving the RRC Connection Setup Complete message, and sending the CIoT data to the S-GW when the information of the S-GW is inquired.

Figure 6A:
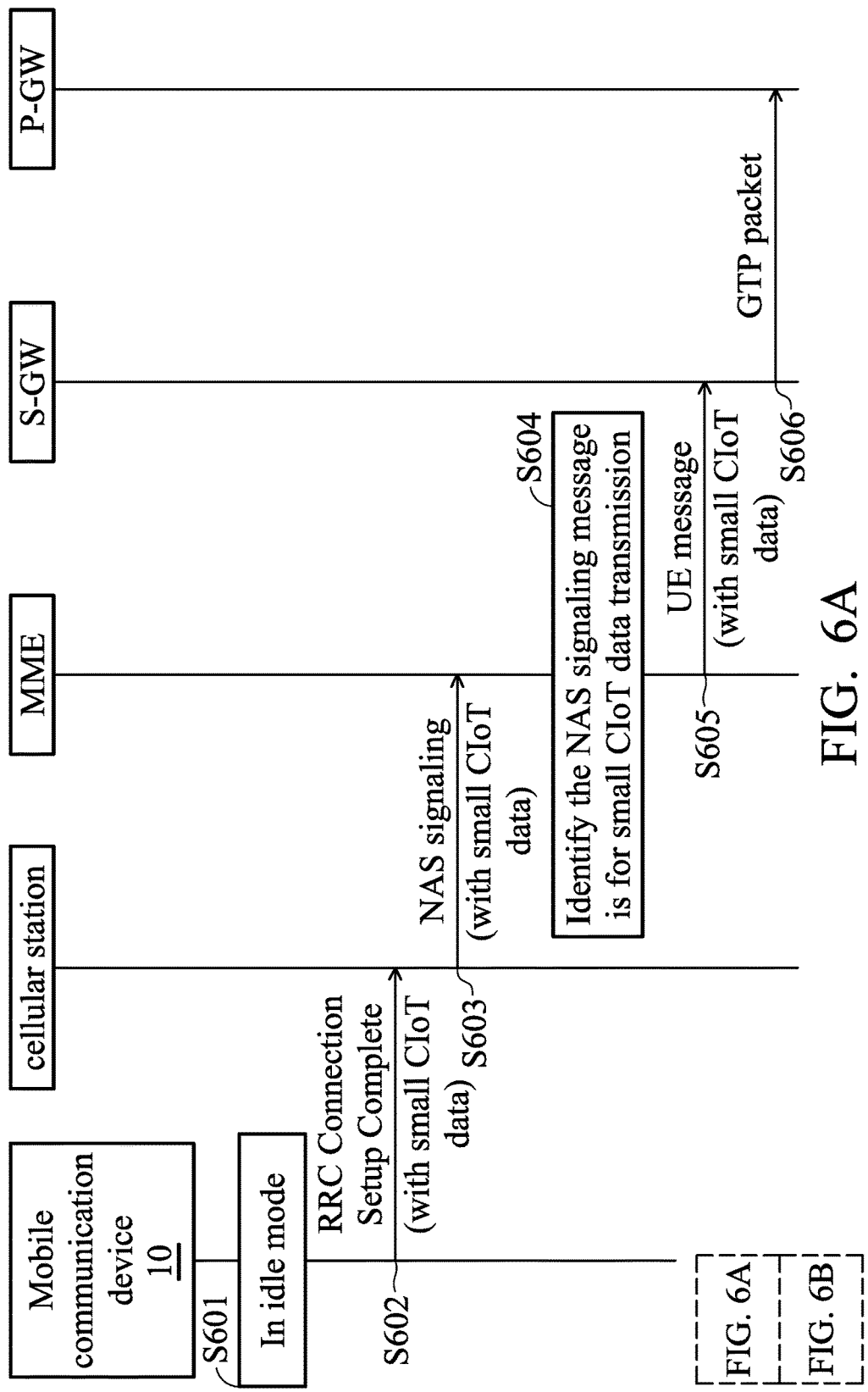
FIGS. 6A and 6B show a message sequence chart illustrating the signaling flow for delivering MO CIoT data through an RRC Connection Setup Complete message according to another embodiment of the application.
Figure 6B:
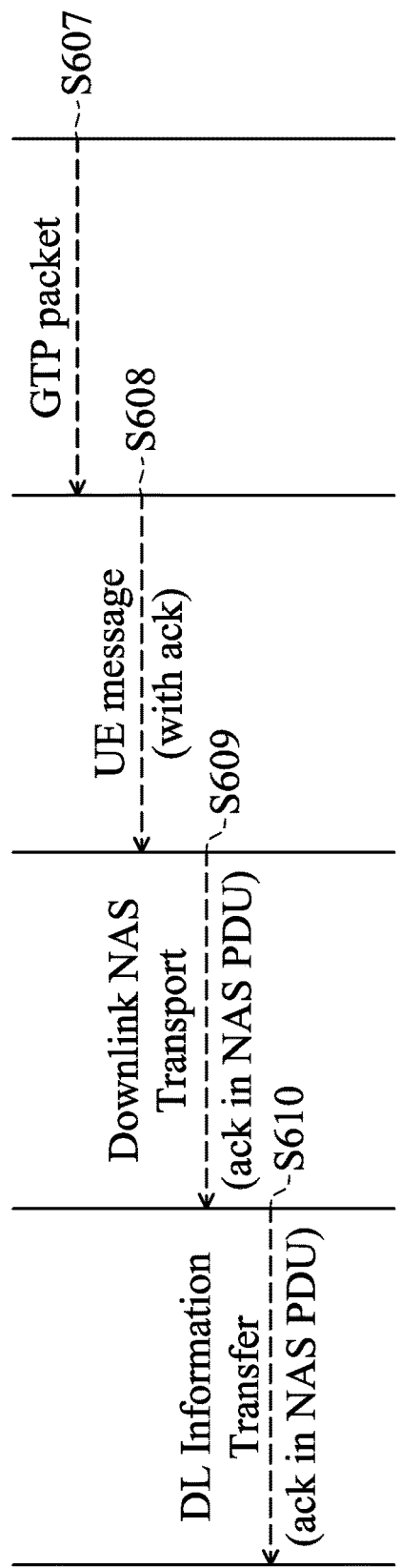

FIGS. 6A and 6B show a message sequence chart illustrating the signaling flow for delivering MO CIoT data through an RRC Connection Setup Complete message according to another embodiment of the application. Similar to steps S501 and S502 in FIG. 5A, the mobile communication device 10 includes the small CIoT data in a NAS PDU and sends an RRC Connection Setup Complete message comprising the NAS PDU to the serving cellular station, when initiating small CIoT data transmission in the idle mode (steps S601~S602). In response to receiving the RRC Connection Setup Complete message, the cellular station retrieves the NAS PDU and sends it in a NAS signaling message to the MME (step S603).

Next, the MME identifies that the NAS signaling message is for small CIoT data transmission by determining whether the NAS signaling message comprises a NAS PDU with CIoT data (step S604). In one embodiment, the NAS signaling message may be a Service Request message with a newly defined IE for storing the CIoT data. In another embodiment, the NAS signaling message may be a newly defined message dedicated for small CIoT data transmission.

Subsequently, the MME obtains the CIoT data from the NAS PDU, and sends the CIoT data in a UE message to the S-GW (step S605). When receiving the UE message, the S-GW retrieves the IP address and Tunnel TED of the P-GW, forms a GTP packet including the CIoT data, and sends the GTP packet to the P-GW (step S606).

In one embodiment, the mobile communication device 10 may request an acknowledgement of the small CIoT data transmission, and the P-GW may receive a response IP packet with the acknowledgement. When receiving the response IP packet, the P-GW may reply to the S-GW with a GTP packet including the acknowledgement (step S607). The S-GW may send the acknowledgement in a UE message to the MME (step S608).

After that, the MME may encapsulate the acknowledgement in a NAS PDU of a Downlink NAS Transport message, and send the Downlink NAS Transport message to the cellular station (step S609). In response to receiving the Downlink NAS Transport message, the cellular station may retrieve the NAS PDU, include it in a DL Information Transfer message, and send the DL Information Transfer message to the mobile communication device 10 (step S610).

Please note that, unlike a conventional MME, the MME in this embodiment is capable of identifying if the NAS signaling message received from the cellular station is used for small CIoT data transmission, and if so, obtaining the CIoT data from the NAS PDU of the NAS signaling message and sending the CIoT data to the S-GW.

Figure 7A:
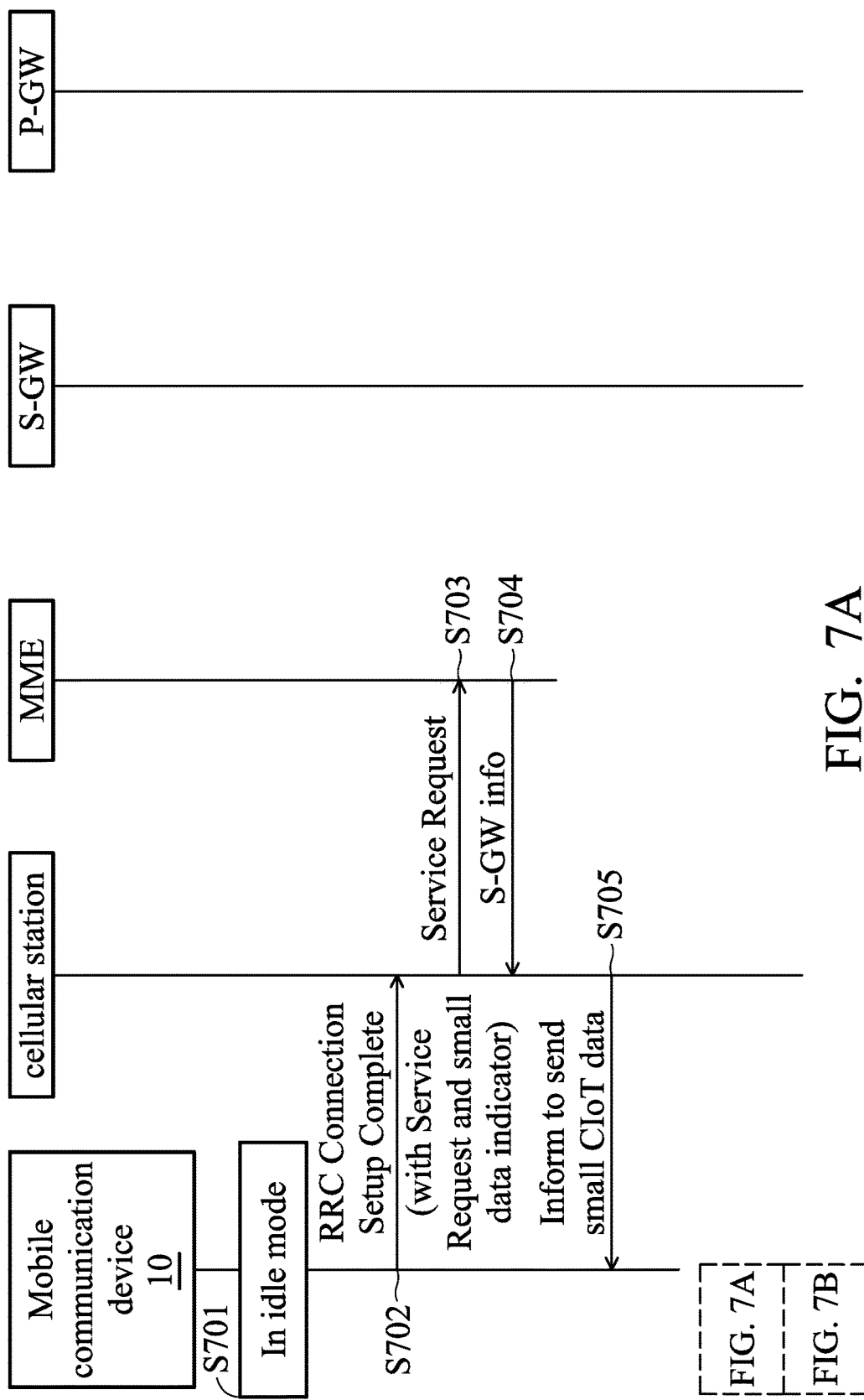
FIGS. 7A and 7B show a message sequence chart illustrating the signaling flow for delivering MO CIoT data through an UL Information Transfer message according to an embodiment of the application.
Figure 7B:
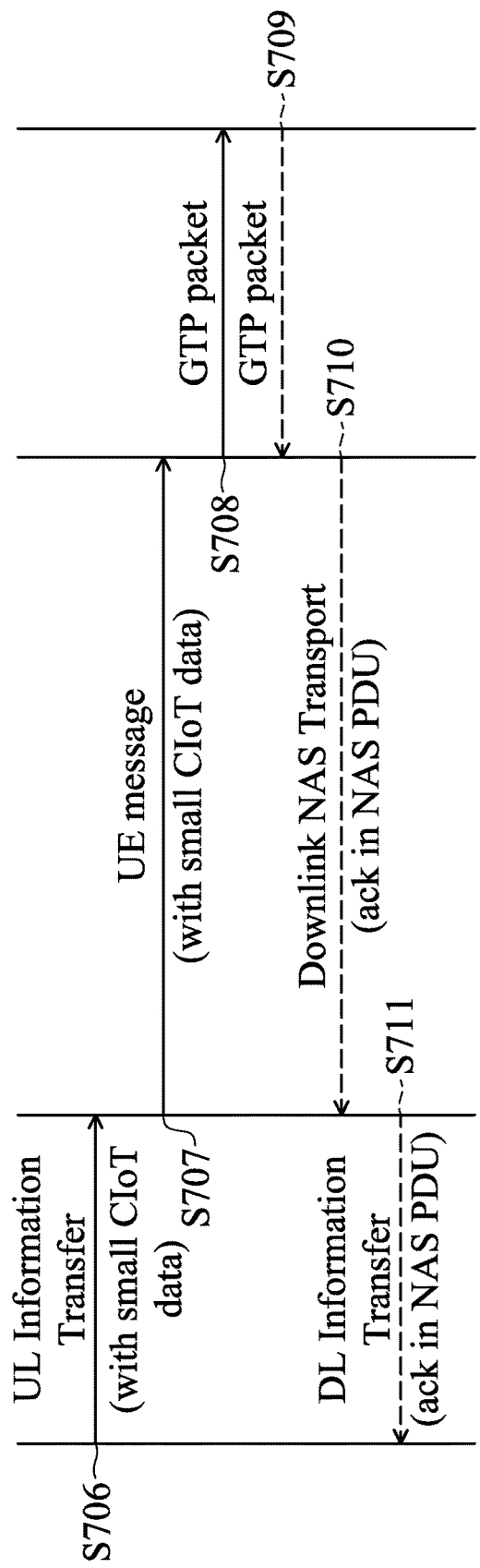

FIGS. 7A and 7B show a message sequence chart illustrating the signaling flow for delivering MO CIoT data through an Uplink (UL) Information Transfer message according to an embodiment of the application. Similar to step S501 in FIG. 5A, the mobile communication device 10 is configured as a CIoT UE and operating in the idle mode (step S701). In response to initiating small CIoT data transmission, the mobile communication device 10 sends an RRC Connection Setup Complete message comprising a Service Request message and an indicator for CIoT data to the serving cellular station (step S702). The cellular station retrieves the Service Request message from the RRC Connection Setup Complete message and sends it to the MME (step S703).

When receiving the Service Request message, the MME sends the information of the S-GW to the cellular station and indicates that the mobile communication device 10 has UL data to send (step S704). Subsequently, the cellular station informs the mobile communication device 10 to send the CIoT data (step S705), and the mobile communication device 10 includes the CIoT data in a NAS PDU of an UL Information Transfer message and sends the UL Information Transfer message to the cellular station (step S706).

When receiving the UL Information Transfer message, the cellular station retrieves the NAS PDU and sends it in a UE message to the S-GW (step S707). The S-GW retrieves the IP address and TEID of the P-GW, forms a GTP packet including the CIoT data retrieved from the NAS PDU, and sends the GTP packet to the P-GW (step S708).

In one embodiment, the mobile communication device 10 may request an acknowledgement of the small CIoT data transmission, and the P-GW may receive a response IP packet with the acknowledgement. When receiving the response IP packet, the P-GW may reply to the S-GW with a GTP packet including the acknowledgement (step S709). After that, the S-GW may include the acknowledgement in a NAS PDU of a Downlink NAS Transport message and send the Downlink NAS Transport message to the cellular station (step S710). In response to receiving the Downlink NAS Transport message, the cellular station may retrieve the NAS PDU, include it in a DL Information Transfer message, and send the DL Information Transfer message to the mobile communication device 10 (step S711).

Please note that, unlike a conventional cellular station, the cellular station in this embodiment is capable of identifying if the mobile communication device 10 requests to send small CIoT data through the RRC Connection Setup Complete message, and if so, inquiring the MME about information of the S-GW, and informing the mobile communication device 10 to send the small CIoT data in a UL Information Transfer message when the information of the S-GW is inquired.

In view of the forgoing embodiments of FIGS. 5A, 5B, 6A, 6B, 7A, and 7B, it will be appreciated that the present application realizes the delivery of MO CIoT data through the RRC Connection Setup Complete message and the UL Information Transfer message, by providing specific signaling flows between the cellular station, MME, and S-GW to solve the problem of the conventional cellular station not knowing the information of the S-GW associated with the idle mode UE. Advantageously, small CIoT data transmission may be achieved using only control-plane messages, without the need to establish user-plane Data Radio Bearers (DRBs) and activate AS security for user-plane DRBs.

Although not shown, in the embodiments of FIGS. 5A, 5B, 6A, 6B, 7A, and 7B, before steps S502, S602, and S702, there may be other signaling for RRC connection establishment between the mobile communication device 10 and the cellular station, and detailed description of that signaling is omitted herein since they are in compliance with the 3GPP Technical Specification (TS) 36.331.

While the application has been described by way of example and in terms of preferred embodiment, it is to be understood that the application is not limited thereto. Those who are skilled in this technology can still make various alterations and modifications without departing from the scope and spirit of this application. Therefore, the scope of the application shall be defined and protected by the following claims and their equivalents.

What is claimed is:

1. A cellular station, comprising:
a wireless transceiver, configured to perform wireless transmission and reception to and from a mobile communication device; and
a controller, configured to receive a RRC (Radio Resource Control) Connection Setup Complete message comprising a service request and an indicator for Cellular Internet of Things (CIoT) data from the mobile communication device via the wireless transceiver, send the service request to a Mobility Management Entity (MME) in response to receiving the RRC Connection Setup Complete message, request the mobile communication device via the wireless transceiver to send an Uplink (UL) Information Transfer message comprising the CIoT data when receiving information of a Serving Gateway (S-GW) from the MME, and send the CIoT data to the S-GW according to the information of the S-GW, wherein the request is not made by the MME nor by the S-GW.

2. The cellular station of claim 1, wherein the controller is further configured to, when receiving a Downlink NAS (Non-Access Stratum) Transport message comprising an acknowledgement of the CIoT data from the S-GW, send a Downlink (DL) Information Transfer message comprising the acknowledgement of the CIoT data to the mobile communication device via the wireless transceiver.

3. The cellular station of claim 1, wherein the CIoT data is encapsulated in a NAS Protocol Data Unit (PDU) comprised in the RRC Connection Setup Complete message.

* * * * *